July 3, 1928.
F. W. MARTIN
RAILWAY BOOSTER
Filed Dec. 7, 1923
1,675,571
2 Sheets-Sheet 1
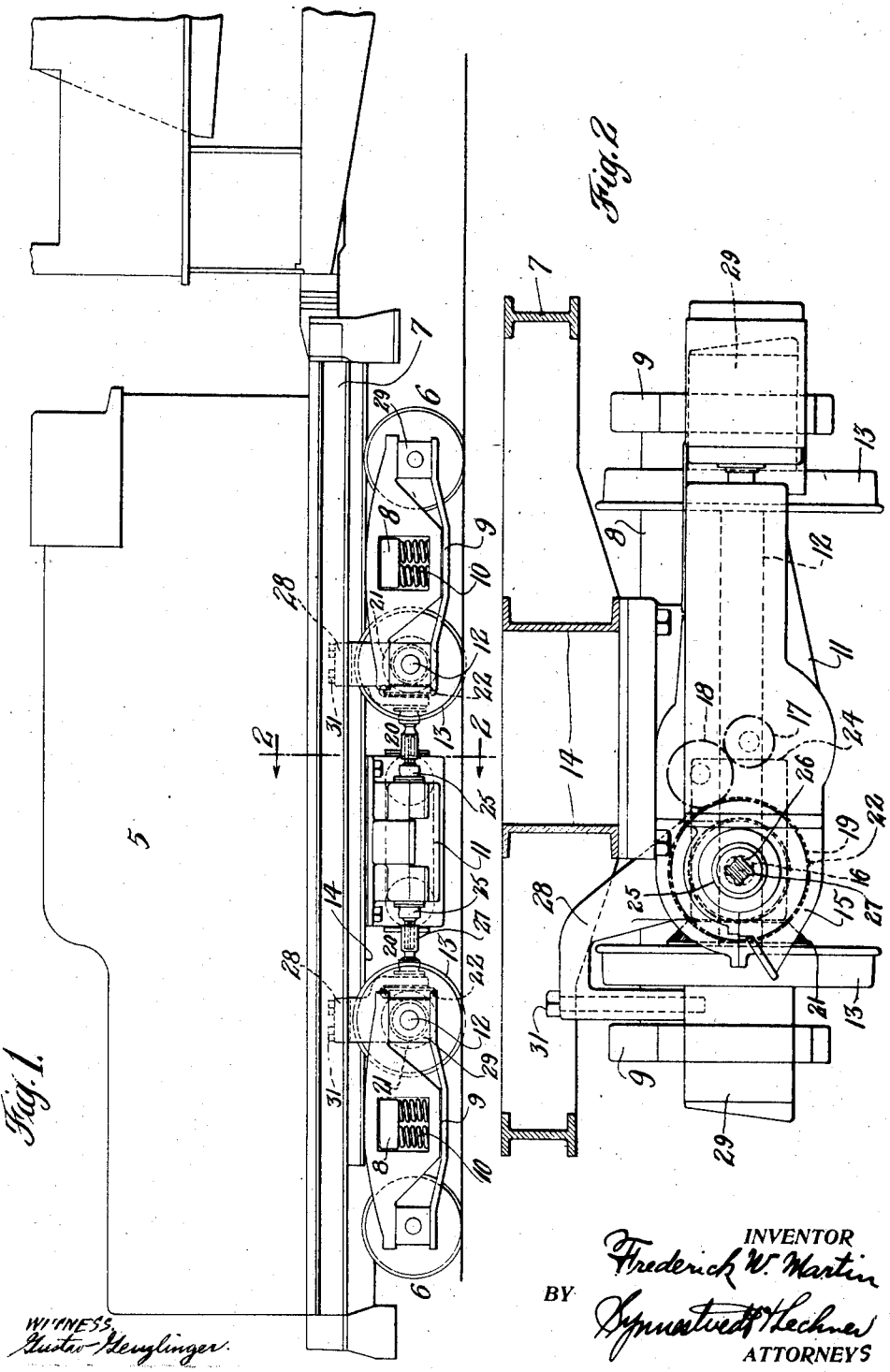

July 3, 1928.

F. W. MARTIN

RAILWAY BOOSTER

Filed Dec. 7, 1923

WITNESS
Gustav Genglinger.

INVENTOR
Frederick W. Martin
BY
Sprenstwedt & Lechner
ATTORNEYS

Patented July 3, 1928.

1,675,571

UNITED STATES PATENT OFFICE.

FREDERICK W. MARTIN, OF MANHATTAN BEACH, NEW YORK, ASSIGNOR TO FRANKLIN RAILWAY SUPPLY COMPANY, A CORPORATION OF DELAWARE.

RAILWAY BOOSTER.

Application filed December 7, 1923. Serial No. 679,077.

My invention relates to railway boosters, my object being to increase the power available for train propulsion—especially for starting and at slow speeds—by utilizing wheels of a locomotive tender or other such railway vehicle or car for driving purposes. I aim to do this, by preference, with forms of equipment already commercially available: in other words, to apply booster motors such as are already used on locomotives to other types of rolling stock with little or no essential alteration of either boosters or rolling stock, and without necessity for much in the way of special parts or other extra material. This, of course, is highly advantageous where it is desired to equip existing rolling stock with boosters, as well as in the case of new rolling stock that is to be so equipped. I also provide for obviating interference of the usual relative motion of truck wheels and tender with the driving connection between booster and wheels, preferably, in general, by mounting the booster fast on the tender structure and making the driving connections to the wheels accommodate the motion. This is generally a simpler and more rugged method than to mount the booster for movement relative to the tender.

How these and other objects and advantages can be realized through my invention in a novel manner—and very simply and inexpensively—will appear from my description hereinafter of a selected and preferred embodiment.

In the drawings, Fig. 1 is a somewhat diagrammatic side view of a locomotive tender equipped with a booster motor in accordance with my invention—the rear portion of the locomotive also appearing.

Fig. 2 is a fragmentary view at right angles to Fig. 1, illustrating the relation of the booster to one of the truck axles and to the superjacent structure, with various parts in section as indicated by the line 2—2 in Fig. 1.

Figure 3:
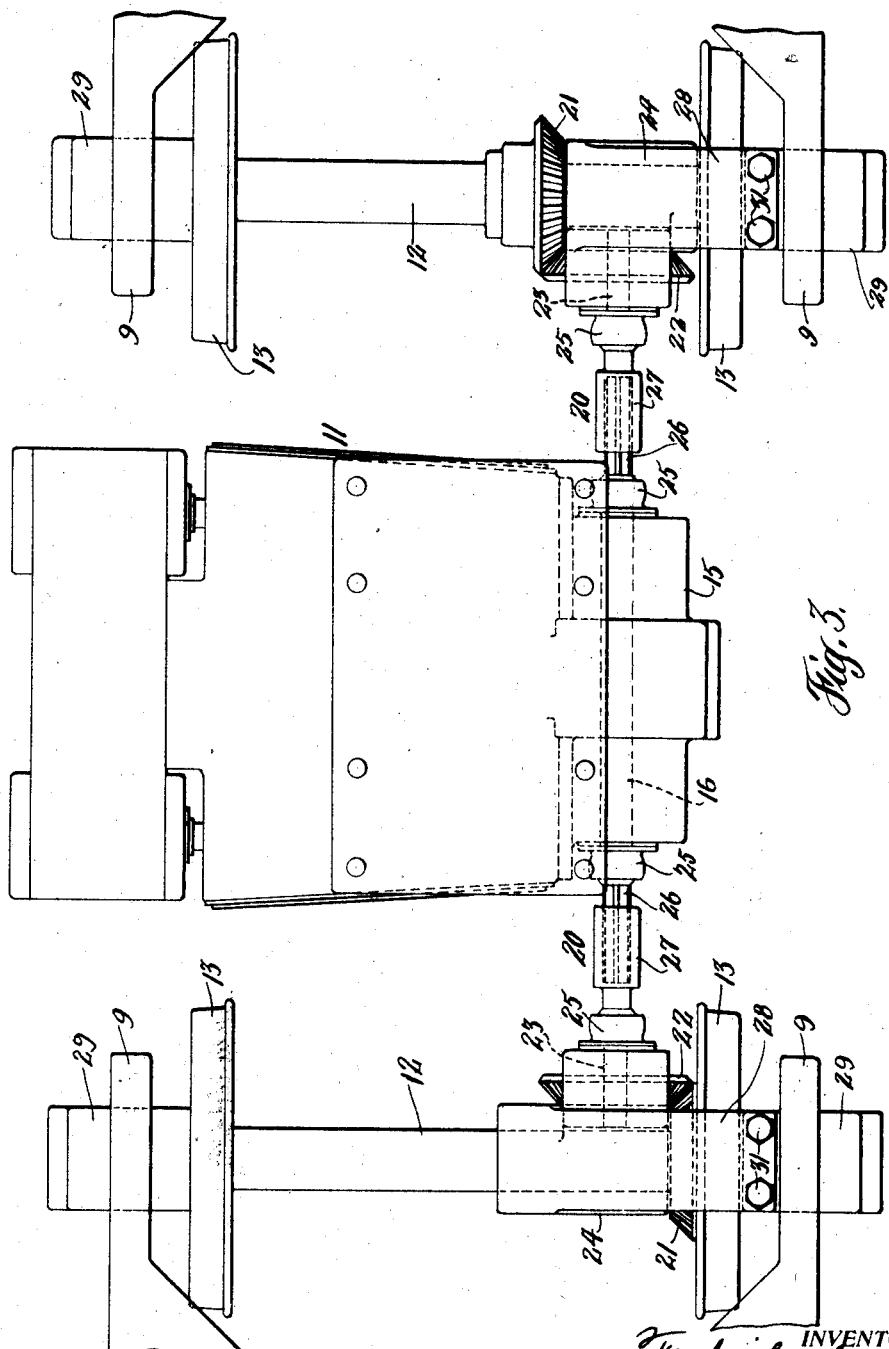
Fig. 3 is a plan view of the booster and two of the truck axles, with the driving connections from the former to the latter.

As shown in the drawings, the tender body 5 and its trucks 6 are of ordinary construction, with tender frame 7 resting on and pivoted to transverse bolsters 8 whose ends are movable up and down in the side frames 9 and are supported by them through interposed springs 10. Beneath the tender 5, about midway between its trucks 6, is a booster motor 11, shown as of the two cylinder steam engine type now in common use on locomotives. Being in the present instance intended to drive an axle 12 and wheels 13 of each of the trucks 6, the booster 11 is preferably mounted transversely of the tender 5, as shown, with the appropriately constructed top of its frame and casing structure secured to the lower flanges of the fore and aft channel members 14 of the tender frame 7. In lieu of the wheel axle usually mounted in the bearing portion 15 of the booster frame structure, there is a shaft 16, extending fore and aft of the tender (since the booster extends transversely), and disconnectibly driven by the booster engines through the usual gearing 17, 18, 19.

From the ends of the booster motor shaft 16, there are driving connections 20, 20 fore and aft to the truck axles 12 directly adjacent the booster 11, including bevel gears 21, 21 fast to the axles and other bevel gears 22, 22 on short shaft members 23, 23 mounted in bearing structures 24, 24. In the present instance, each driving connection 20 is laterally flexible and longitudinally variable in order to accommodate the relative motion of axle 12 and booster 11 (that is permitted by the bolster springs 10 and the pivotal mounting of the truck), and comprises ball and socket universals 25, 25 attached to the shafts 16 and 23, with an interposed slip-joint member composed of telescoping parts 26, 27 non-rotatively interengaged as shown in Fig. 2. The bearing structures 24 are mounted on the axles 12, and have arms 28 that extend over the wheels 13 and engage suitable parts of (or associated with) the trucks 6,—the axle boxes 29, in the present instance,—so as to prevent turning or other displacement of the bearings 24 on the axles 12. As shown most clearly in Figs. 1 and 2, the arms 28 are preferably fastened to the boxes 26 by bolts 31. The bevel gears 21 face opposite ways on their respective axles 12, 12, so that the latter shall be driven in the same direction. One of these gears is close against the wheel 13 on the same axle and the other correspondingly but reversely arranged, so as to bring the shaft 16 as far to one side of the tender as practicable and allow the booster to be accommodated under the tender 5 without lateral projection therebeyond (see Fig. 2).

It will be seen, therefore, that the booster 11 is arranged and connected to drive four of the tender wheels 13 through short, efficient connections, which in no wise interfere with the relative motion of wheels and tender due to inequalities of the track, etc. The booster 11 is accessibly mounted, in such a way that it can very easily be installed on existing equipment, or removed for overhauling. All the parts and connections are simple, rugged, and durable. The only extra parts required are the shaft 16, universals 25, slip-joints 26, 27, gears 21, 22, and bearings 24,—all except the last of which are themselves more or less standard, and all without exception easily obtained or manufactured. Owing to the large number of wheels 13 driven (four) in proportion to the power of the booster 11, the factor of adhesion required is low, and the effective starting power correspondingly very high.

I claim:

1. The combination with a railway vehicle having a plurality of trucks, of a shaft extending fore and aft thereof at one side, with driving connections to axles of different trucks close inside the corresponding wheels, and a booster motor at the other side of the shaft from said wheels driving them through the shaft.

2. The combination with a railway vehicle frame having idler wheels spring mounted for up and down movement relative thereto, of a shaft extending fore and aft at one side of the frame having flexible driving connections with said wheels whereby to automatically accommodate relative motion of wheels and vehicle frame, and a booster motor mounted on the frame at the other side from said shaft and arranged for entrainment with the latter for converting said idler wheels into driving wheels.

3. The combination with a railway vehicle frame and trucks therefor provided with idler wheels, of a shaft extending fore and aft at one side of the frame having laterally flexible and longitudinally variable driving connections with said wheels for automatically accommodating the relative motion of trucks and vehicle frame, and a booster motor rigidly mounted on the frame at the other side from said shaft for driving the latter and to thereby constitute said wheels driving wheels.

4. The combination of a railway vehicle, a booster thereon, driving connections from the booster to a truck axle including a fore and aft member with a bevel gear thereon and a coacting bevel gear on the axle, and a bearing for said member mounted on said axle and restrained as against displacement by means coacting for that purpose with the corresponding axle box.

5. In combination with a railway vehicle, the trucks of which are relatively movable with respect to the vehicle frame and are provided with idler wheels, a shaft extending fore and aft of the vehicle to one side of the longitudinal center line thereof, flexible driving connections between the ends of said shaft and the axles of said trucks, and a booster motor extending laterally of said shaft and being arranged for entrainment with said shaft whereby, when so entrained, to convert the idler wheels into driving wheels.

6. The combination with a railway vehicle, the trucks of which are provided with idler wheels, of a booster mechanism arranged to supply driving power to said idler wheels, said mechanism including a booster motor rigidly supported upon the frame of the vehicle and a shaft extending longitudinally of said vehicle and to one side of said motor, said shaft being arranged to be driven by said motor and being further flexibly geared to the axles of said idler wheels whereby to convert the latter into driving wheels, the arrangement being such as not to interfere with the relative movement between said trucks and frame.

7. The combination with a railway vehicle, the trucks of which are provided with idler wheels relatively movable with respect to the vehicle frame, of a booster mechanism arranged to intermittently supply driving power to said wheels, said mechanism including a booster motor rigidly supported upon said vehicle frame and a shaft arranged to be geared to the axles of said idler wheels, the connections between said shaft and axles being laterally flexible and longitudinally variable to permit relative movement between said vehicle frame and said wheels.

In testimony whereof, I have hereunto signed my name.

FREDERICK W. MARTIN.